United States Patent
Tilton

(10) Patent No.: US 7,137,328 B1
(45) Date of Patent: Nov. 21, 2006

(54) HYDRAULIC PRESS

(76) Inventor: Richard H. Tilton, 20447 431 St. Ave., Desmet, SD (US) 57231

(*) Notice: Subject to any disclaimer, the term of this patent is extended or adjusted under 35 U.S.C. 154(b) by 74 days.

(21) Appl. No.: 10/719,239

(22) Filed: Nov. 21, 2003

(51) Int. Cl.
B26D 9/00 (2006.01)

(52) U.S. Cl. ......................................... 83/527; 83/682

(58) Field of Classification Search ................ 83/539, 83/682, 527, 529, 699.41, 683; 72/464, 404
See application file for complete search history.

(56) References Cited

U.S. PATENT DOCUMENTS

| | | | |
|---|---|---|---|
| 2,084,993 A * | 6/1937 | Aff .............................. 83/679 |
| 3,140,634 A | 7/1964 | McDaniel, Jr. |
| 3,148,575 A * | 9/1964 | Thyng ...................... 83/699.11 |
| 3,468,206 A | 9/1969 | Bakula |
| 3,678,724 A | 7/1972 | Stone |
| 3,701,276 A | 10/1972 | Malmgren |
| 3,710,665 A | 1/1973 | Eddy |
| 3,735,627 A | 5/1973 | Eburn, Jr. |
| 3,866,522 A | 2/1975 | Oswalt, Jr. |
| 4,156,377 A * | 5/1979 | Bracewell ..................... 83/524 |
| 4,348,943 A | 9/1982 | Bouyoucos |
| 4,531,439 A | 7/1985 | Valente |
| 4,576,380 A | 3/1986 | Shields |
| 4,741,084 A | 5/1988 | Ronk |
| 5,394,782 A * | 3/1995 | Magnuson et al. ........... 83/605 |
| 5,575,186 A | 11/1996 | Kempen |
| 5,598,737 A | 2/1997 | Oide |

* cited by examiner

Primary Examiner—Kenneth E. Peterson

(57) ABSTRACT

A hydraulic press for working a variety of metals. The hydraulic press includes a frame member designed for resting upon a horizontal support surface and having at least two vertical stanchions with a horizontal support member extending between the vertical stanchions and being positioned adjacent a top end of each of the vertical stanchions; an arm member pivotally coupled to the frame member; and a hydraulic cylinder having a piston selectively extendable from the hydraulic cylinder, the hydraulic cylinder being operationally coupled to the frame member and the piston being operationally coupled to the arm member whereby extension of the piston from the hydraulic cylinder pivotally moves a first end of arm member away from the frame member.

13 Claims, 6 Drawing Sheets

HYDRAULIC PRESS

BACKGROUND OF THE INVENTION

1. Field of the Invention

The present invention relates to multi-purpose metal working machines and more particularly pertains to a new hydraulic press for working a variety of metals and metal products.

2. Description of the Prior Art

The use of multi-purpose metal working machines is known in the prior art. Illustrative examples include U.S. Pat. No. 3,140,634; U.S. Pat. No. 3,678,724; U.S. Pat. No. 3,710,665; U.S. Pat. No. 3,701,276; U.S. Pat. No. 4,531,439; U.S. Pat. No. 4,576,380; U.S. Pat. No. 5,598,737; U.S. Pat. No. 4,348,943; U.S. Pat. No. 3,735,627; U.S. Pat. No. 4,741,084; U.S. Pat. No. 3,866,522; U.S. Pat. No. 5,575,186; and U.S. Pat. No. 3,468,206. Other examples include Scotchman models 5014-TM and PortaFab-45.

While these devices fulfill their respective, particular objectives and requirements, the need remains for a machine that utilizes an offset pivot arm to drive both a punch assembly and a press assembly.

SUMMARY OF THE INVENTION

The present invention meets the needs presented above by providing an integrated machine with shear, press, and punch capabilities driven off of a common hydraulic cylinder through a single arm member.

An advantage of the present invention is to provide a new hydraulic press that used a ram member coupled to a medial portion of the arm member to provide a 50 ton capability press through the force of the hydraulic cylinder and leverage of the arm member.

Another advantage of the present invention is to provide a new hydraulic press that utilizes an offset pivot point to increase the leverage through the arm member to provide an 80 ton capability punch coupled to a second end of the arm member.

Still yet another advantage of the present invention is compatibility with a wide variety of standard punch and press dies without intermediate adapters or modules.

To this end, the present invention generally comprises a frame member designed for resting upon a horizontal support surface and having at least two vertical stanchions with a horizontal support member extending between the vertical stanchions and being positioned adjacent a top end of each of the vertical stanchions; an arm member pivotally coupled to the frame member; and a hydraulic cylinder having a piston selectively extendable from the hydraulic cylinder, the hydraulic cylinder being operationally coupled to the frame member and the piston being operationally coupled to the arm member whereby extension of the piston from the hydraulic cylinder pivotally moves a first end of arm member away from the frame member.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

The objects of the invention, along with the various features of novelty which characterize the invention, are pointed out with particularity in the claims annexed to and forming a part of this disclosure.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
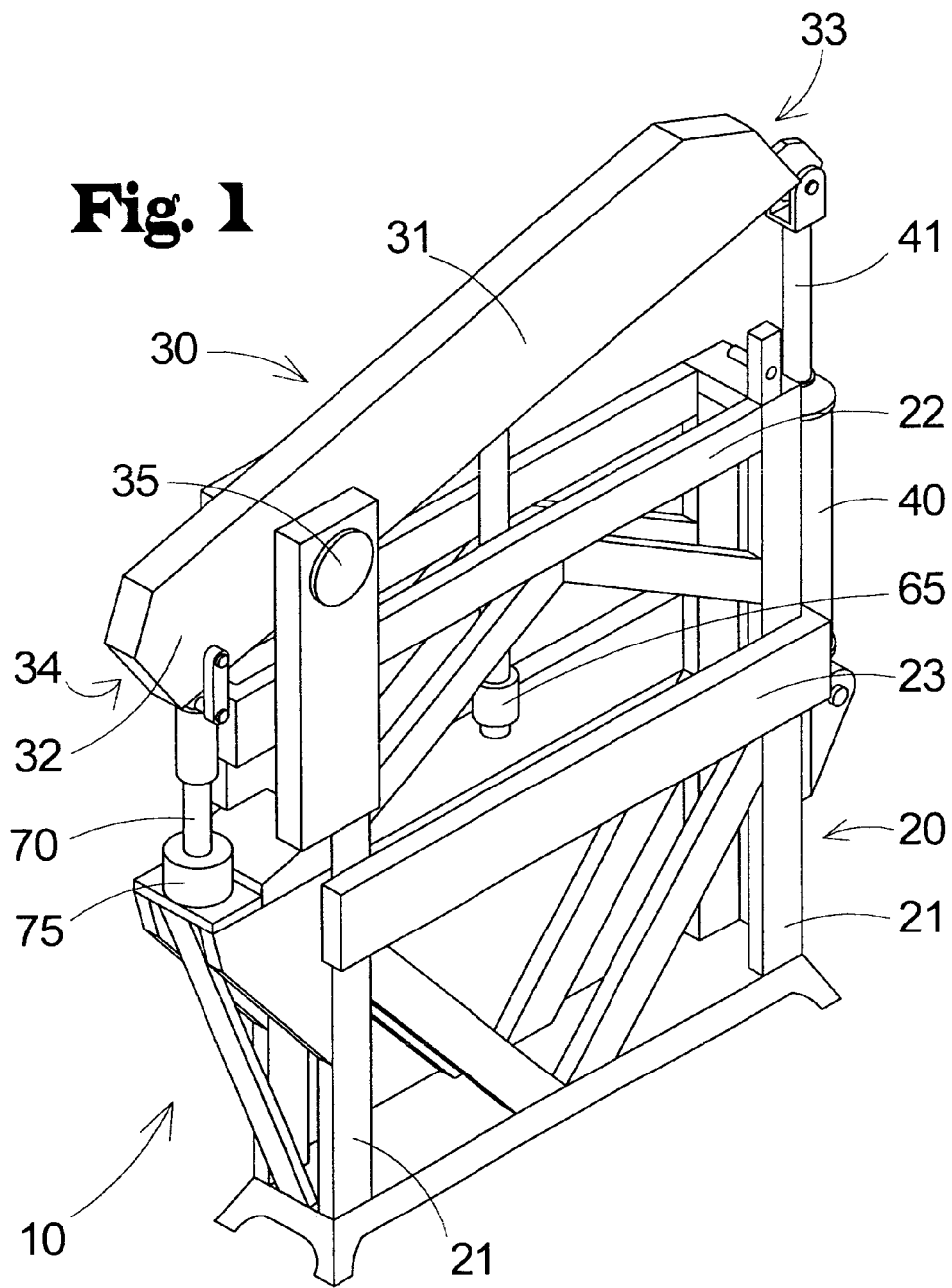
FIG. 1 is a schematic perspective view of a new hydraulic press according to the present invention.
Figure 2:
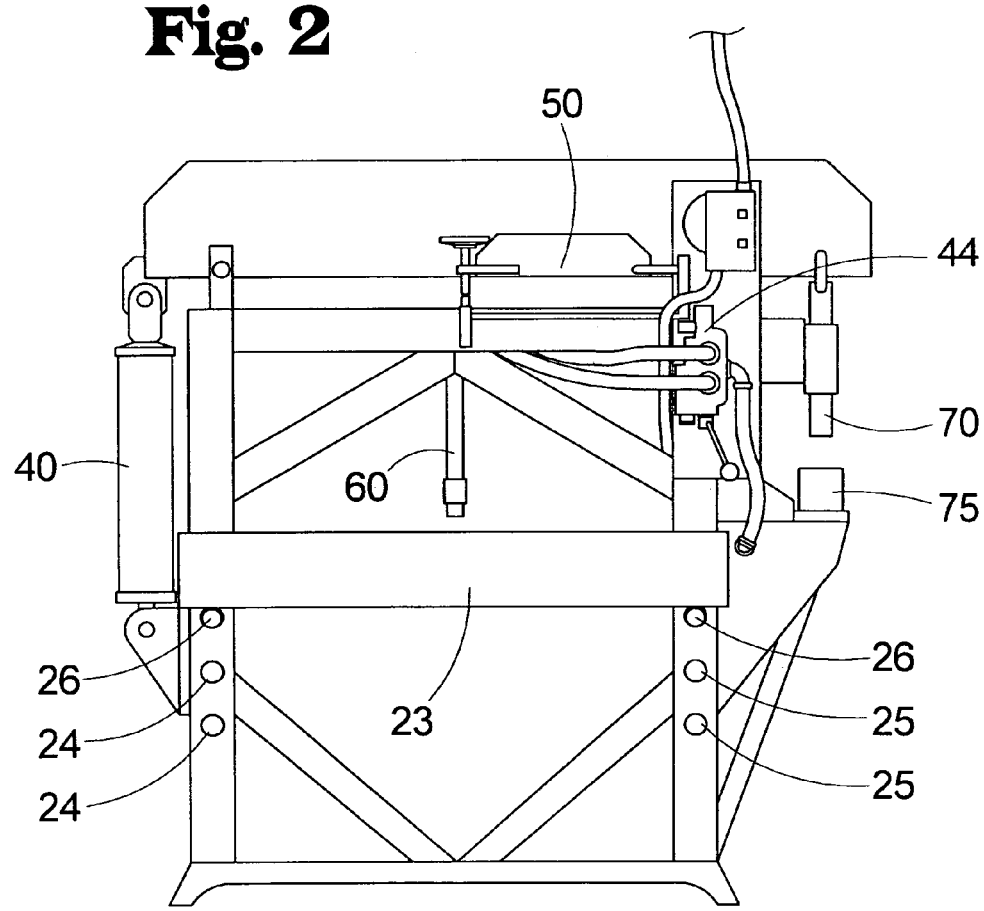
FIG. 2 is a schematic front view of the present invention.
Figure 3:
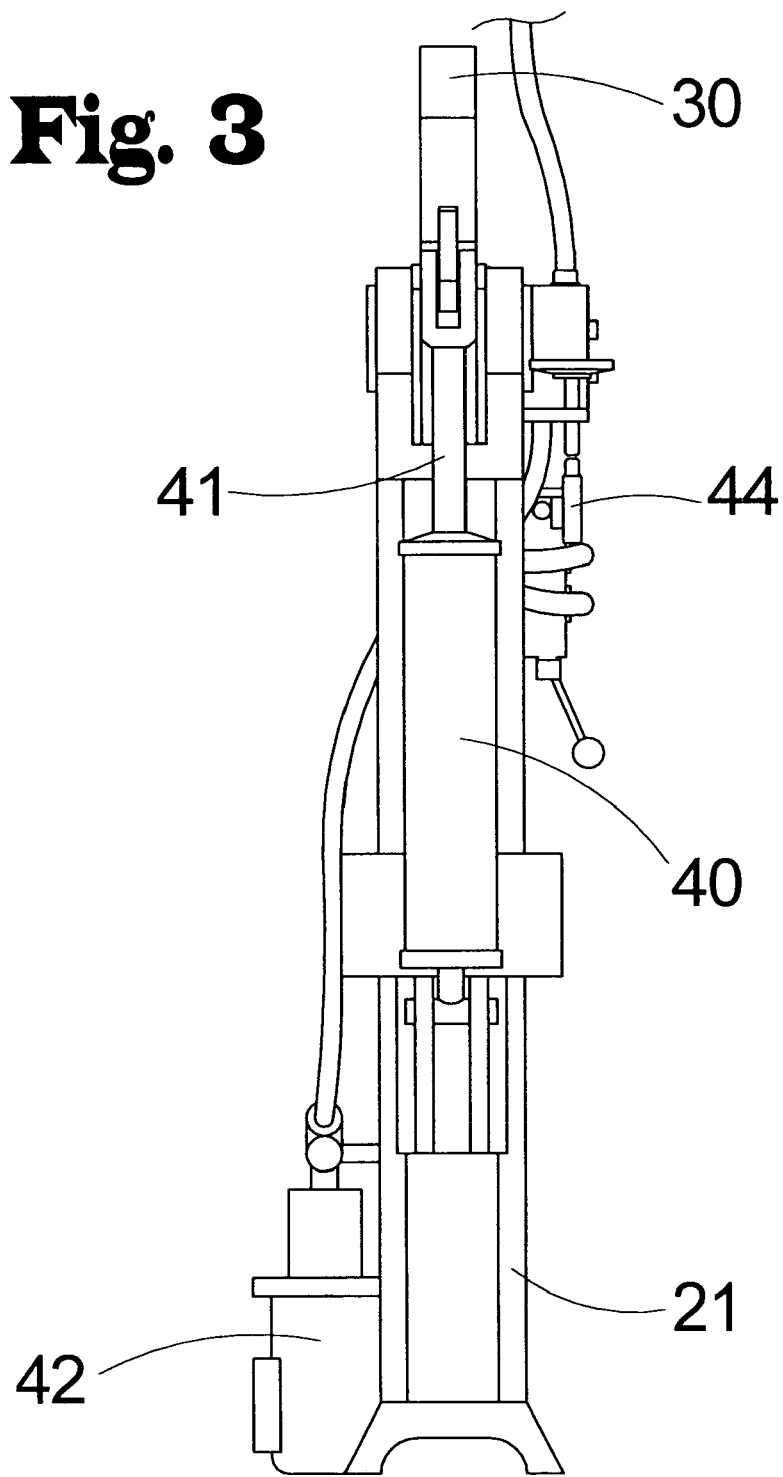
FIG. 3 is a schematic side view of the present invention.
Figure 4:
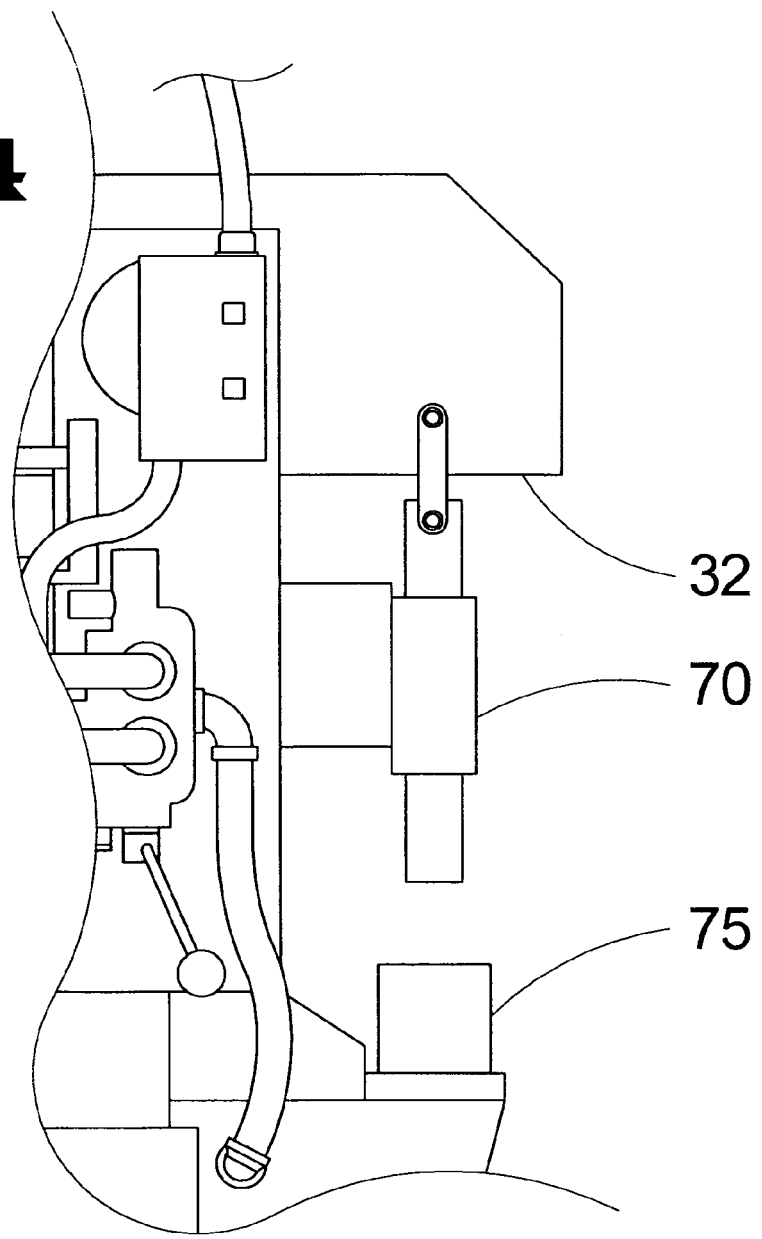
FIG. 4 is a schematic perspective view of the punch assembly of the present invention.
Figure 5:
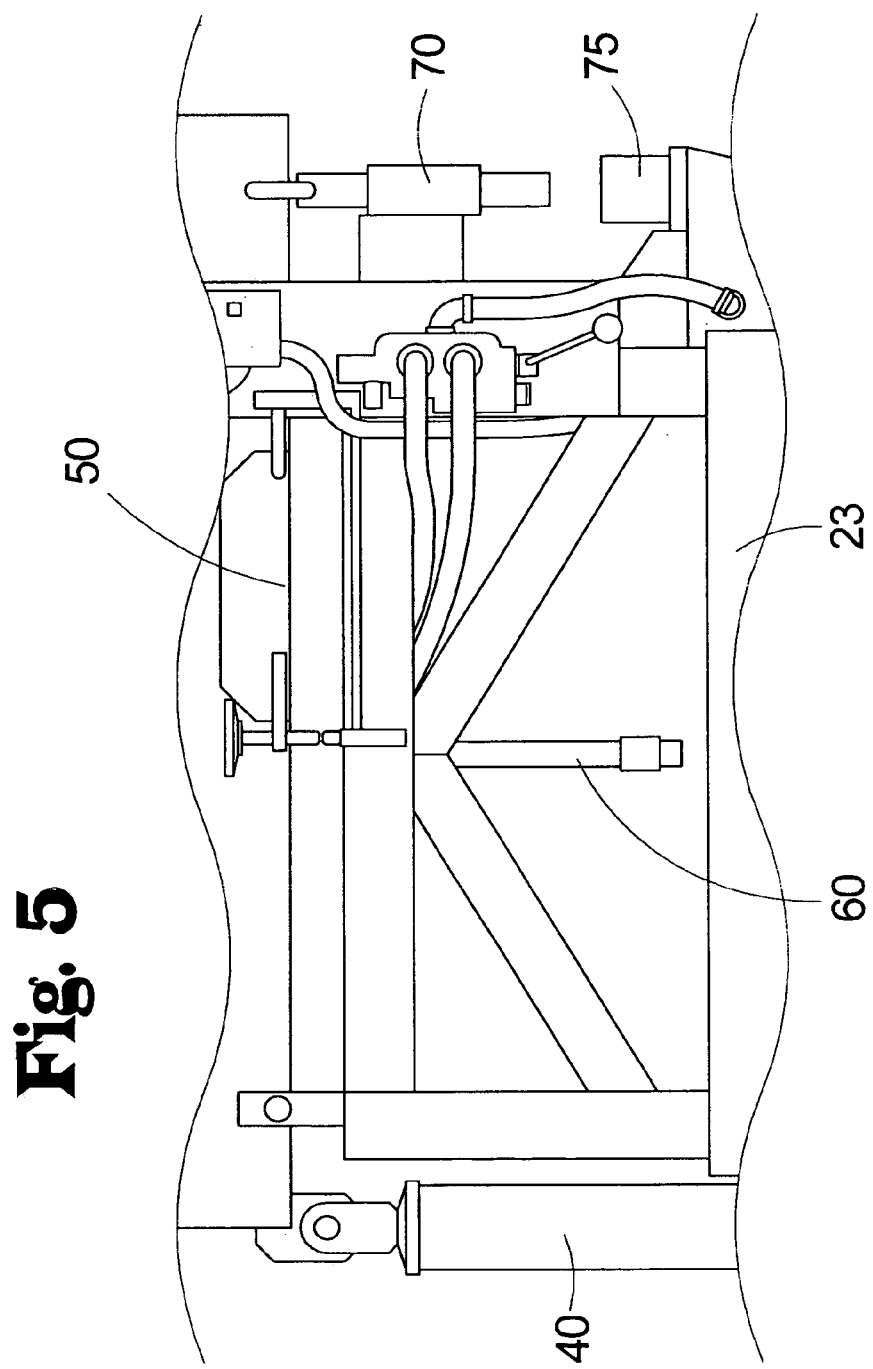
FIG. 5 is a schematic perspective view of the press assembly of the present invention.
Figure 6:
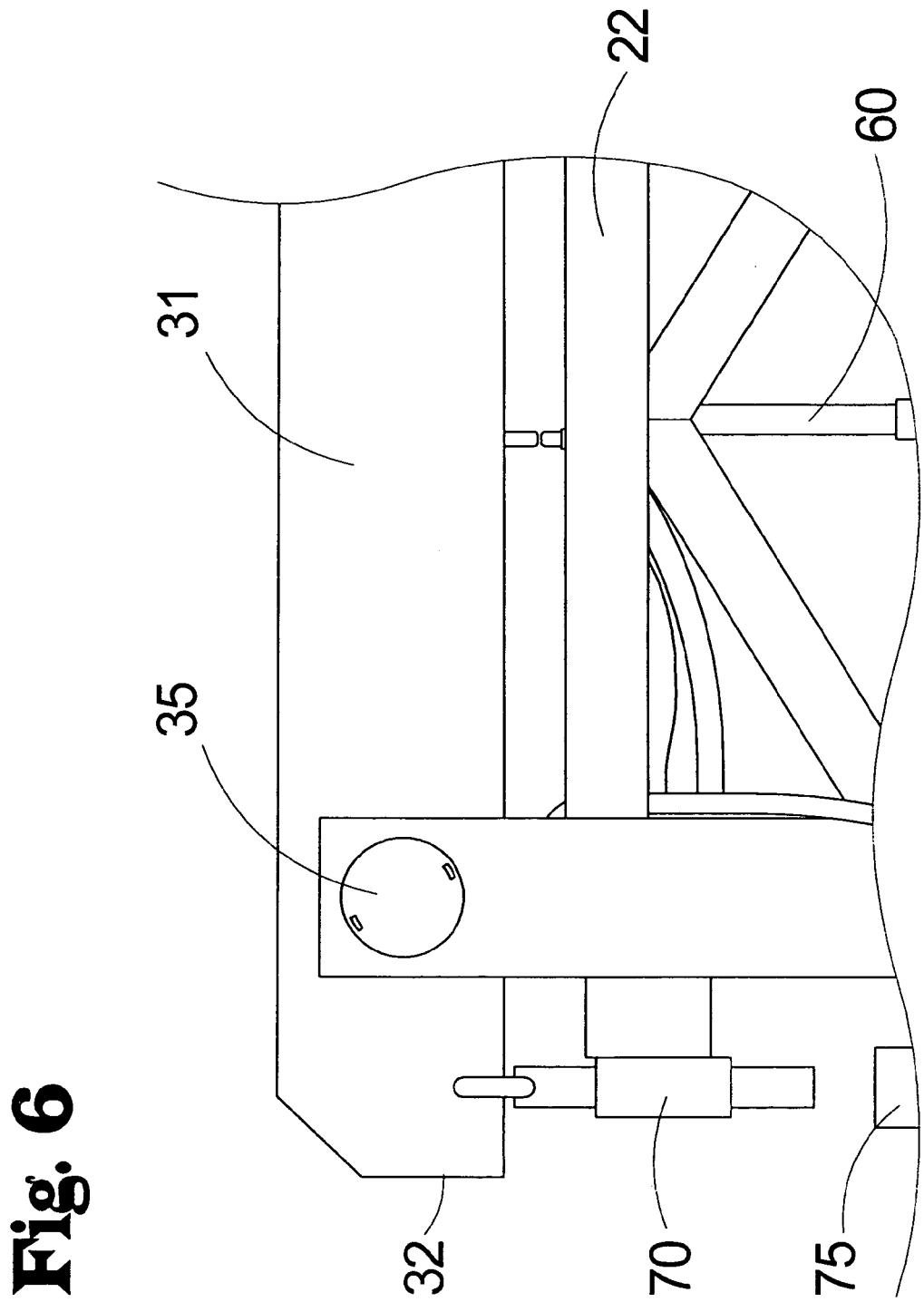
FIG. 6 is a schematic front view of the shear blade of the present invention.

With reference now to the drawings, and in particular to FIGS. 1 through 6 thereof, a new hydraulic press embodying the principles and concepts of the present invention and generally designated by the reference numeral 10 will be described.

As best illustrated in FIGS. 1 through 6, the hydraulic press 10 generally comprises a frame member 20, an arm member 30, a hydraulic cylinder 40, a shear blade 50, a press assembly 65, and a punch assembly 70.

The frame member 20 is designed for resting upon a horizontal support surface. Preferably, the frame member 20 has at least two vertical stanchions 21 and a horizontal support member 22 extending between the vertical stanchions 21. The horizontal support member 22 is preferably positioned adjacent a top end of each of the vertical stanchions 21.

The arm member 30 is pivotally coupled to the frame member 20. The hydraulic cylinder 40 has a piston 41 selectively extendable from the hydraulic cylinder 40. The hydraulic cylinder 40 is operationally coupled to the frame member 20. The piston 41 is operationally coupled to the arm member 30. Thus, extension of the piston 41 from the hydraulic cylinder 40 pivotally moves the first end 33 of arm member 30 away from the frame member 20.

A hydraulic reservoir 42 may be operationally coupled to the hydraulic cylinder 40 for providing additional hydraulic force.

The control assembly 44 is operationally coupled to the hydraulic cylinder 40 for selectively actuating the hydraulic cylinder 40 and extending the piston 41.

The shear blade 50 is operationally coupled to a lower portion of the arm member 30 for cutting metal when the piston 41 is retracted into the hydraulic cylinder 40.

Preferably, the arm member 30 has a pivot portion 35 pivotally coupled to the frame member 20, a first extent 31 extending outwardly from the pivot portion 35 terminating at the first end 33 of the arm member 30. Similarly, the arm member 30 also has a second extent 32 extending outwardly from the pivot portion 35 opposite the first extent 31 and ending at the second end 34. The first extent 34 is substantially longer than the second extent 32 to improve leverage of the piston 41 for applying downwardly directed force at the second end 34.

Most preferably, the first extent 31 has a length at least three times as long as a length of the second extent 32.

In an embodiment, the punch assembly 70 is operationally coupled to the second end 34 of the arm member 30. A punch mating assembly 75 is operationally coupled to the frame member 20 and aligned with the punch assembly 70. The punch assembly 70 engages the punch mating assembly 75 when the first end 33 of the arm member 30 is moved away from the frame assembly 20 by the piston 41.

In a further embodiment, the punch assembly 70 engages the punch mating assembly 75 with eighty tons of force.

In yet a further embodiment, the press assembly 60 includes a ram member 65, which is operationally coupled to a medial portion of the arm member 30. The ram member 65 extends downward from the arm member 30 for transferring a force from the arm member 30 to a piece of metal being worked.

A second horizontal support member 23 may be operationally coupled between the two vertical stanchions 21. The second horizontal support member 23 is preferably positionable below the horizontal support member 22, for supporting the piece of metal being worked. The ram member 65 is most preferably positioned at a medial portion of the first extent 31 of said arm member 30. A first plurality of apertures 24 extends through a first one of the two vertical stanchions 21, and are dispersed in a linear array. Similarly, a second plurality of apertures 25 extends through a second one of the two vertical stanchions 21. The second plurality of apertures 25 is also dispersed in a linear array. A pair of coupling members 26 are provided for operationally coupling the second horizontal support member 23 to the two vertical stanchions 21. Each one of the pair of coupling members 26 is positionable through a selected pairing of one of the first plurality of apertures 24 and one of the second plurality of apertures 25 whereby a height between the ram member 65 and the second horizontal support 23 is adjustable.

In yet a further embodiment, the ram member 65 develops fifty tons of force.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A metal working machine comprising:
   a frame adapted for resting upon a horizontal support surface, said frame including at least two vertical stanchions and a horizontal support member extending between said vertical stanchions, said horizontal support member being positioned adjacent to a top end of said vertical stanchions;
   an arm member pivotally coupled to said frame, said arm member having a first end and a second end, said arm member being pivotally coupled to said frame at a pivot location between said first and second ends;
   a hydraulic cylinder having a piston selectively extendable from said hydraulic cylinder, said hydraulic cylinder being operationally coupled to said frame, said piston being operationally coupled to said arm member toward said first end in a manner such that extension of said piston from said hydraulic cylinder pivotally moves said first end of said arm member away from said frame and moves said second end of said arm member toward said frame;
   wherein a first portion of said arm member is located between said pivot location and said first end and a second portion of said arm member is located between said pivot location and said second end;
   a shear blade mounted on the first portion of said arm member for shearing materials against said horizontal support member when said piston is retracted into said hydraulic cylinder;
   a punch assembly mounted on the second portion of said arm member and a punch mating assembly mounted on said frame member, said punch mating assembly being aligned with said punch assembly such that said punch assembly engages said punch mating assembly when said first end of said arm member is moved away from said frame by said piston;
   a second horizontal support member mounted on and extending between said two vertical stanchions for supporting the piece of metal being worked;
   a ram member mounted on the first portion of said arm member and extending downwardly from said arm member toward said second horizontal support member for transferring a force from said arm member to a workpiece positioned on said second support member;
   means for adjusting a height of said second horizontal support member to adjust a distance between said second horizontal support member and said arm member.

2. The machine of claim 1, further comprising a hydraulic reservoir operationally coupled to said hydraulic cylinder for providing additional hydraulic force.

3. The machine of claim 1, wherein said first portion of said arm has a length at least three times as long as a length of said second portion of said arm member.

4. The machine of claim 1, wherein a length of said first portion of said arm member is longer than a length of said second portion of said arm member.

5. The machine of claim 1, wherein said ram member is positioned approximately half of a distance between said pivot location on said arm member and said first end of said arm member.

6. The machine of claim 1, wherein said punch assembly engages said punch mating assembly with eighty tons of force and said ram member develops fifty tons of force.

7. The machine of claim 1, wherein said punch assembly engages said punch mating assembly with eighty tons of force.

8. A metal working machine comprising:
   a frame member adapted for resting upon a horizontal support surface, said frame member having at least two vertical stanchions, said frame member having a horizontal support member extending between said vertical stanchions, said horizontal support member being positioned adjacent a top end of each of said vertical stanchions;
   an arm member pivotally coupled to said frame member;
   a hydraulic cylinder having a piston selectively extendable from said hydraulic cylinder, said hydraulic cylinder being operationally coupled to said frame member, said piston being operationally coupled to said arm member whereby extension of said piston from said hydraulic cylinder pivotally moves said a first end of arm member away from said frame member;
a hydraulic reservoir operationally coupled to said hydraulic cylinder for providing additional hydraulic force;
a control assembly operationally coupled to said hydraulic cylinder for selectively actuating said hydraulic cylinder whereby said piston is extended; and
a shear blade operationally coupled to a lower portion of said arm member for cutting metal when said piston is retracted into said hydraulic cylinder;
a punch assembly operationally coupled to a second end of said arm member;
a punch mating assembly operationally coupled to said frame member, said punch mating assembly being aligned with said punch assembly;
said punch assembly engaging said punch mating assembly when said first end of said arm member is moved away from said frame assembly by said piston;
said arm member having a pivot portion pivotally coupled to said frame member, said arm member having a first extent extending outwardly from said pivot portion, said first extent terminating at said first end;
said arm member having a second extent extending outwardly from said pivot portion opposite said first extent, said second extent ending at said second end;
said first extent being substantially longer than said second extent to improve leverage of said piston member for applying downwardly directed force at said second end;
a ram member operationally coupled to said arm member, said ram member extending downwardly from said arm member, said ram member being for transferring a force from said arm member to a piece of metal being worked; and
a second horizontal support member operationally coupled between said two vertical stanchions, said second horizontal support member being positionable below said horizontal support member for supporting the piece of metal being worked;
a first plurality of apertures extending through a first one of said two vertical stanchions, said first plurality being dispersed in a linear array;
a second plurality of apertures extending through a second one of said two vertical stanchions, said second plurality being dispersed in a linear array;
a pair of coupling members for operationally coupled said second horizontal support member to said two vertical stanchions, said pair of coupling members being positionable through a selected pairing of said one of said first plurality of apertures and one of said second plurality of apertures whereby a height between said ram member a said second horizontal support is adjustable.

9. A metal working machine comprising:
a frame adapted for resting upon a horizontal support surface, said frame including at least two vertical stanchions and a horizontal support member extending between said vertical stanchions, said horizontal support member being positioned adjacent to a top end of said vertical stanchions;
an arm member pivotally coupled to said frame, said arm member having a first end and a second end, said arm member being pivotally coupled to said frame at a pivot location between said first and second ends;
a hydraulic cylinder having a piston selectively extendable from said hydraulic cylinder, said hydraulic cylinder being operationally coupled to said frame, said piston being operationally coupled to said arm member toward said first end in a manner such that extension of said piston from said hydraulic cylinder pivotally moves said first end of said arm member away from said frame and moves said second end of said arm member toward said frame;
wherein a first portion of said arm member is located between said pivot location and said first end and a second portion of said arm member is located between said pivot location and said second end;
a shear blade mounted on the first portion of said arm member for shearing materials against said horizontal support member when said piston is retracted into said hydraulic cylinder;
a punch assembly mounted on the second portion of said arm member and a punch mating assembly mounted on said frame member, said punch mating assembly being aligned with said punch assembly such that said punch assembly engages said punch mating assembly when said first end of said arm member is moved away from said frame by said piston;
a second horizontal support member mounted on and extending between said two vertical stanchions for supporting the piece of metal being worked;
a ram member mounted on the first portion of said arm member and extending downwardly from said arm member toward said second horizontal support member for transferring a force from said arm member to a workpiece positioned on said second support member;
a hydraulic reservoir operationally coupled to said hydraulic cylinder for providing additional hydraulic force;
a control assembly operationally coupled to said hydraulic cylinder for selectively actuating said hydraulic cylinder whereby said piston is extended; and
means for adjusting a height of said second horizontal support member to adjust a distance between said second horizontal support member and said arm member; and
wherein a length of said first portion of said arm member is approximately three times a length of said second portion of said arm member.

10. The machine of claim 9, further comprising:
said arm member having a pivot portion pivotally coupled to said frame, said arm member having a first extent extending outwardly from said pivot portion, said first extent terminating at said first end;
said arm member having a second extent extending outwardly from said pivot portion opposite said first extent, said second extent ending at said second end;
said first extent being substantially longer than said second extent to improve leverage of said piston member for applying downwardly directed force at said second end.

11. The machine of claim 10, wherein said first extent having a length at least three times as long as a length of said second extent.

12. The machine of claim 9, further comprising:
a first plurality of apertures extending through a first one of said two vertical stanchions, said first plurality being dispersed in a linear array;
a second plurality of apertures extending through a second one of said two vertical stanchions, said second plurality being dispersed in a linear array;
a pair of coupling members for operationally coupled said second horizontal support member to said two vertical stanchions, said pair of coupling members being positionable through a selected pairing of said one of said first plurality of apertures and one of said second plurality of apertures whereby a height between said ram member a said second horizontal support is adjustable.

13. The machine of claim 9, further comprising:

said arm member having a pivot portion pivotally coupled to said frame member, said arm member having a first extent extending outwardly from said pivot portion, said first extent terminating at said first end;

said arm member having a second extent extending outwardly from said pivot portion opposite said first extent, said second extent ending at said second end;

said first extent being substantially longer than said second extent to improve leverage of said piston member for applying downwardly directed force at said second end;

said first extent having a length at least three times as long as a length of said second extent;

said ram member being positioned at a medial portion of said first extent of said arm member;

a first plurality of apertures extending through a first one of said two vertical stanchions, said first plurality being dispersed in a linear array;

a second plurality of apertures extending through a second one of said two vertical stanchions, said second plurality being dispersed in a linear array;

a pair of coupling members for operationally coupled said second horizontal support member to said two vertical stanchions, said pair of coupling members being positionable through a selected pairing of said one of said first plurality of apertures and one of said second plurality of apertures whereby a height between said ram member a said second horizontal support is adjustable; and wherein said ram member develops fifty tons of force.

* * * * *